United States Patent [19]

Gibbemeyer

[11] Patent Number: 4,818,212
[45] Date of Patent: Apr. 4, 1989

[54] BLOW MOLDING APPARATUS
[75] Inventor: Joseph F. Gibbemeyer, Cincinnati, Ohio
[73] Assignee: Cincinnati Milacron Inc., Cincinnati, Ohio
[21] Appl. No.: 60,809
[22] Filed: Jun. 12, 1987

Related U.S. Application Data
[62] Division of Ser. No. 869,499, Jun. 2, 1986.

[51] Int. Cl.$^4$ .............................................. B29C 48/12
[52] U.S. Cl. .................................... 425/529; 264/531; 264/532; 425/534; 425/535
[58] Field of Search ............... 425/522, 524, 529, 535, 425/534; 264/531, 532

[56] References Cited
U.S. PATENT DOCUMENTS

| 3,958,685 | 5/1976 | McDonald et al. | 198/803.9 |
| 4,082,175 | 4/1978 | Gibbemeyer | 198/803.7 |
| 4,185,812 | 1/1980 | Hall | 198/803.7 |

Primary Examiner—Jay H. Woo
Assistant Examiner—Timothy W. Heitbrink
Attorney, Agent, or Firm—Daniel P. Worth

[57] ABSTRACT

A reheat blow molding machine has an improved article handling system that carries heated preforms by a carriage assembly from an oven to a roller chain conveyor which moves them to a blow mold from whence the blown product is moved to an eject station. The motions are linear and cyclical or periodic, drive means for such intermittent motions being provided. Preforms are handled in groups of four, each one being supported by its capping ring in a locating notch on the carriage and by the finish groove in a holder notch above it when it is transferred to the conveyor. All notches are open on the side facing the oven and have self-centering features to get and keep alignment for transfer and positioning at the blow mold. The carriage which moves preforms horizontally toward the conveyor and raises them to the elevation for transfer to the holder notches of the conveyor. Transfer happens when the carriage passes underneath the conveyor whereupon the holder notches of the conveyor engage the preform grooves and sweep or wipe the preforms out of the open side of the carriage notches. The conveyor roller chain moves linearly at right angles to the carriage path and delivers correctly aligned group of preforms to a corresponding group of blow molds. The chain is on its side, i.e. with pins vertical, the holder notches are supported by chain lugs outward of the chain on a leaf spring, and sliding bearing means extend horizontally out from the chain to engage tracks which provide vertical support on the straight runs. At the blow station, the center rod passes through the stuffer cylinder rod and stuffer nose in a fluid-tight telescoping relation. At the ejection station, vertical guides provide position control over the product when the latter is pushed out of the conveyor holder notches whereby the product keeps a vertical alignment and falls away on a predetermined axis.

5 Claims, 10 Drawing Sheets

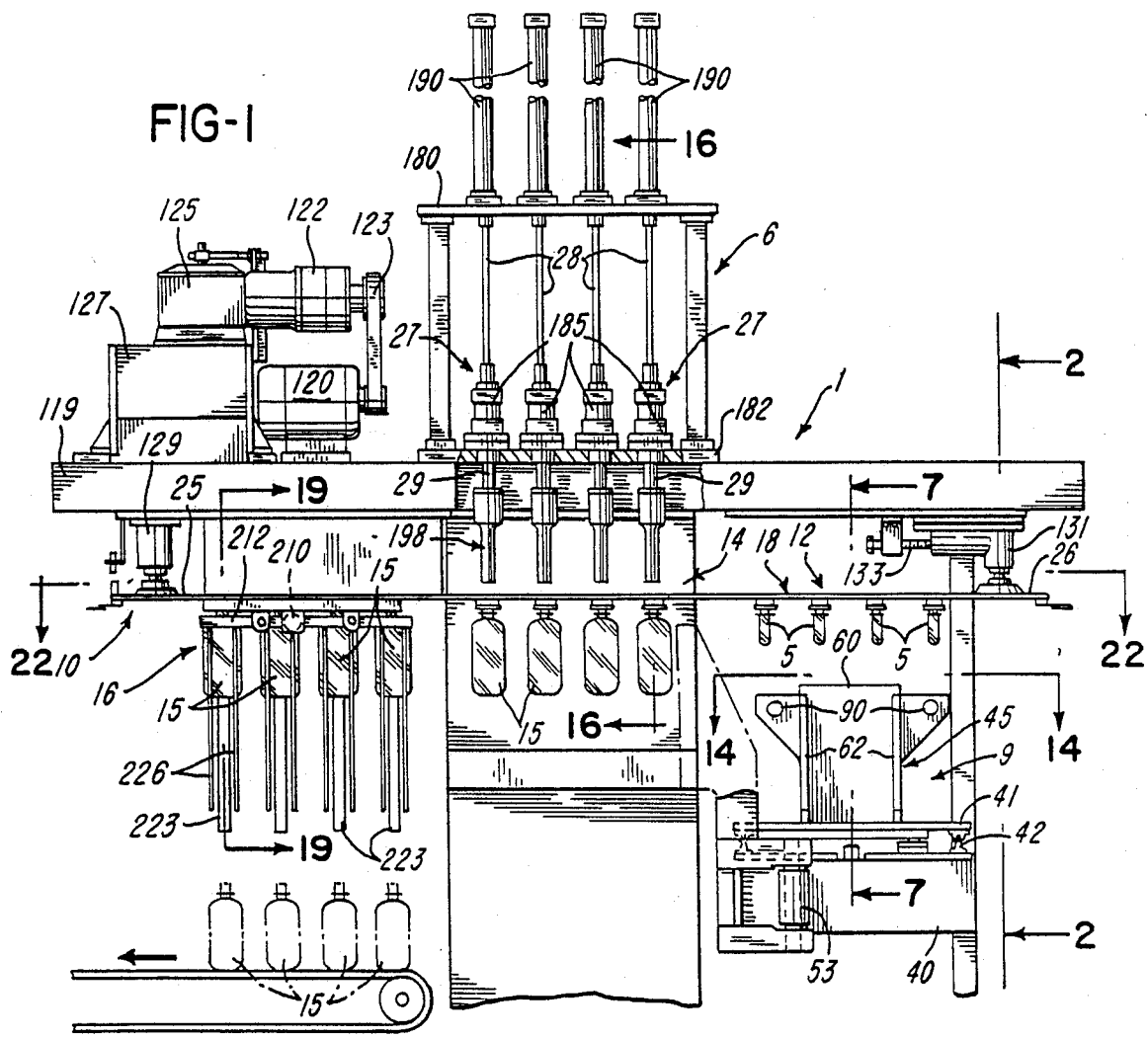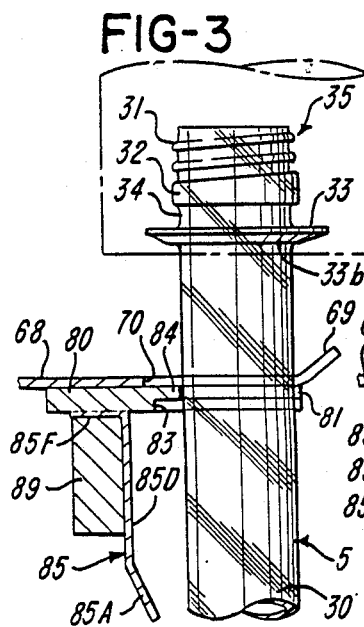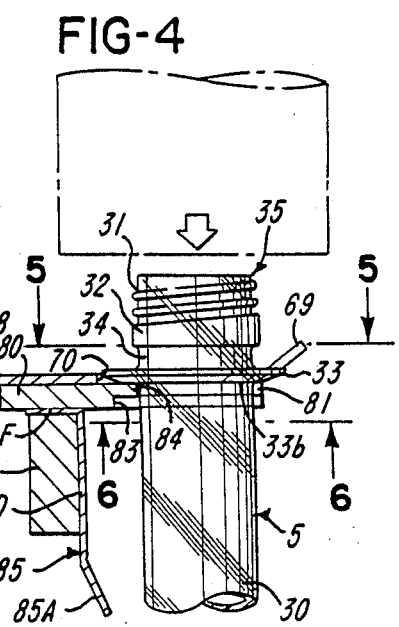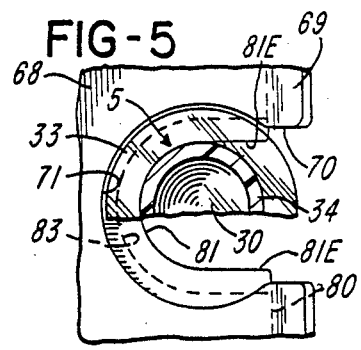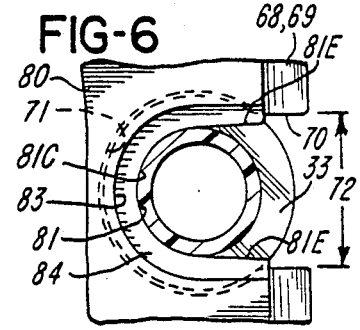

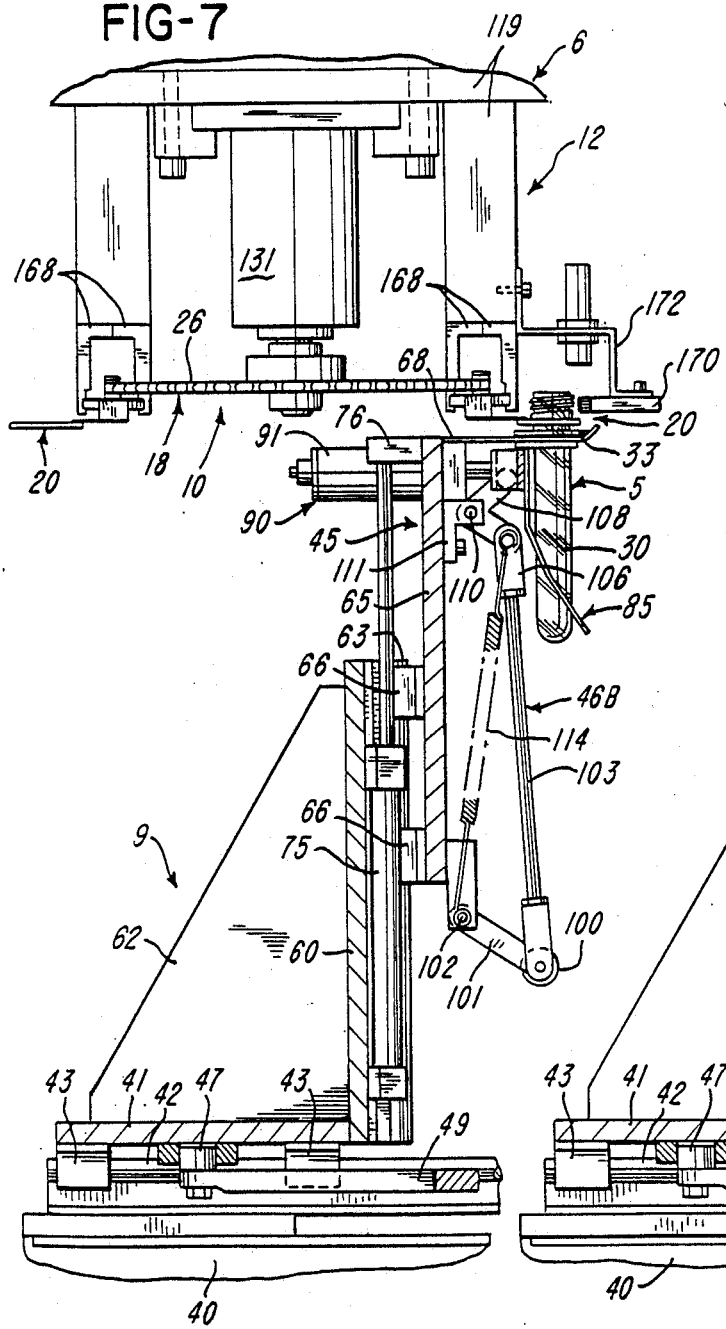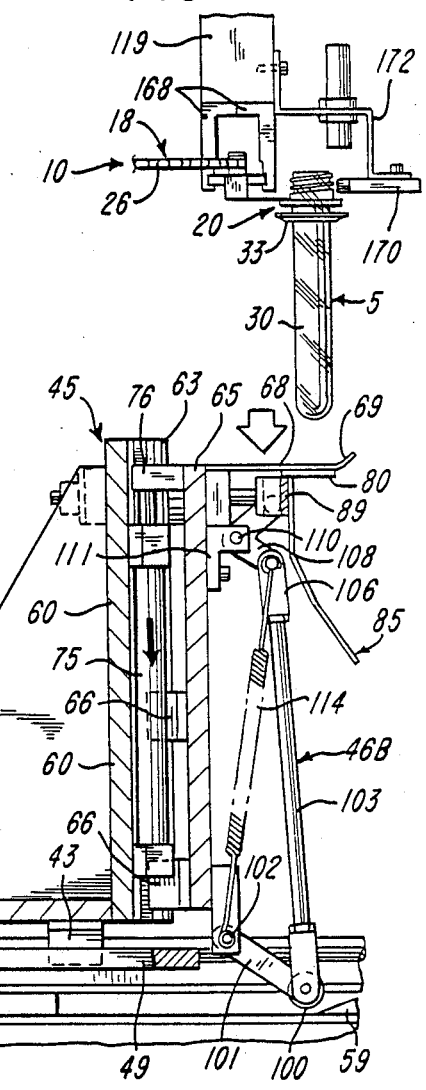

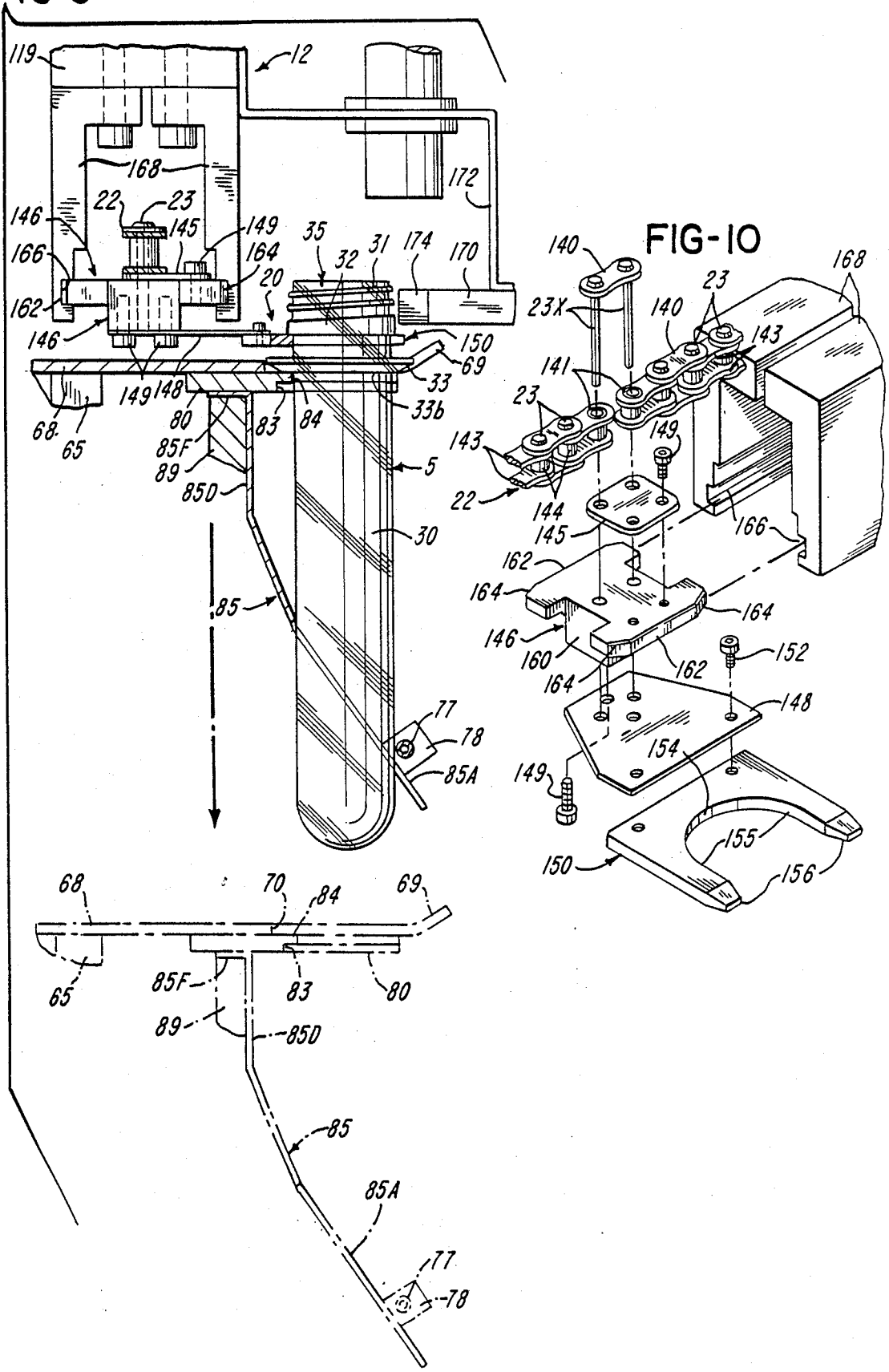

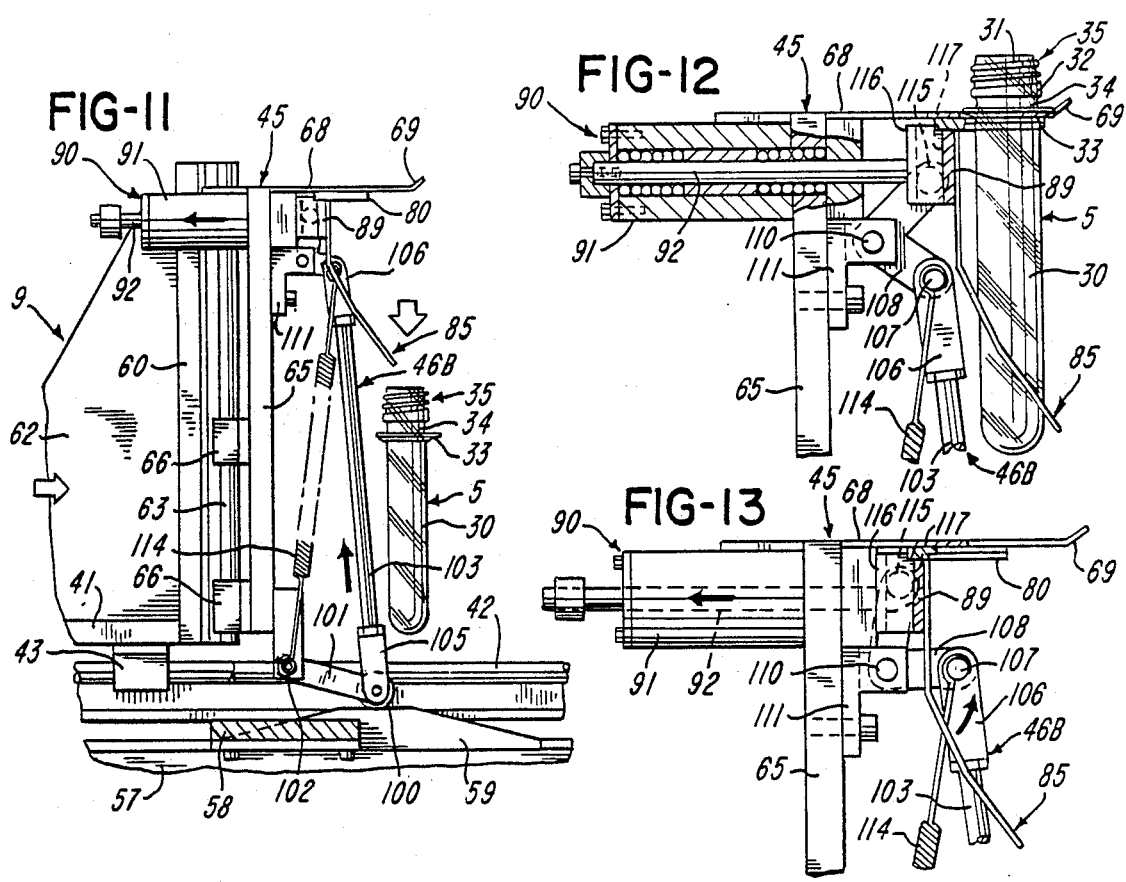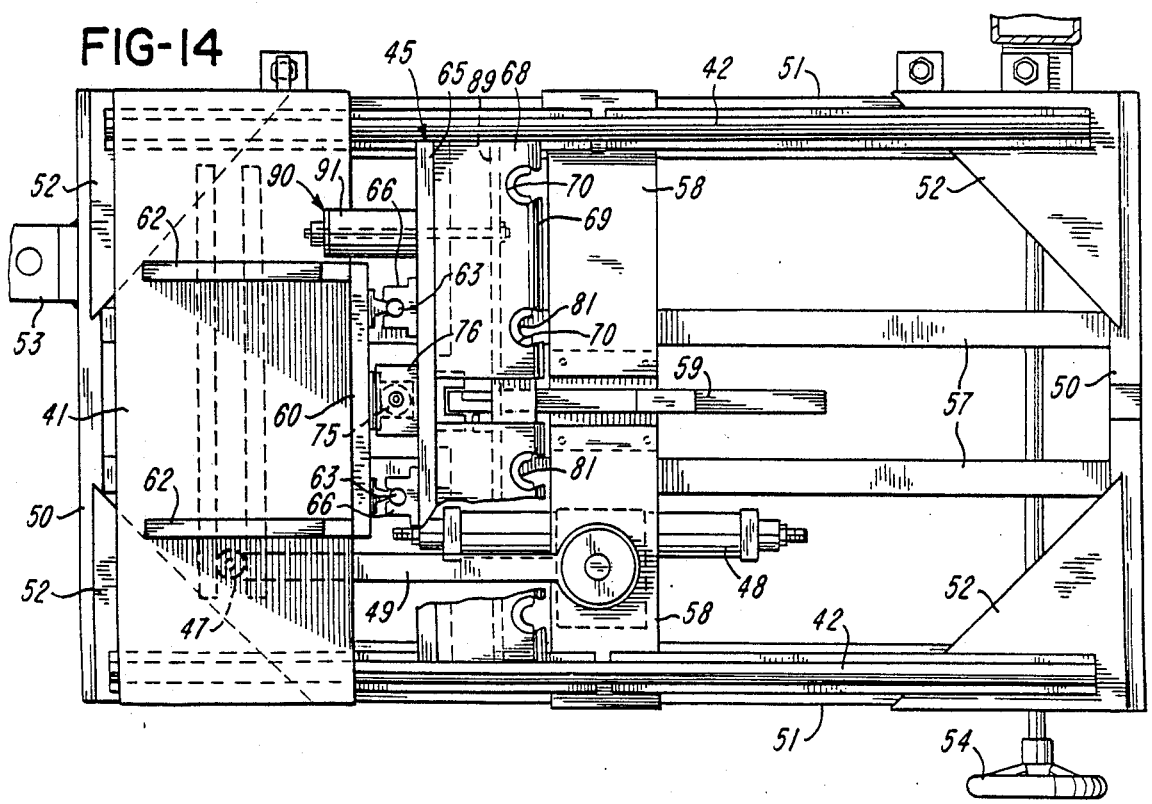

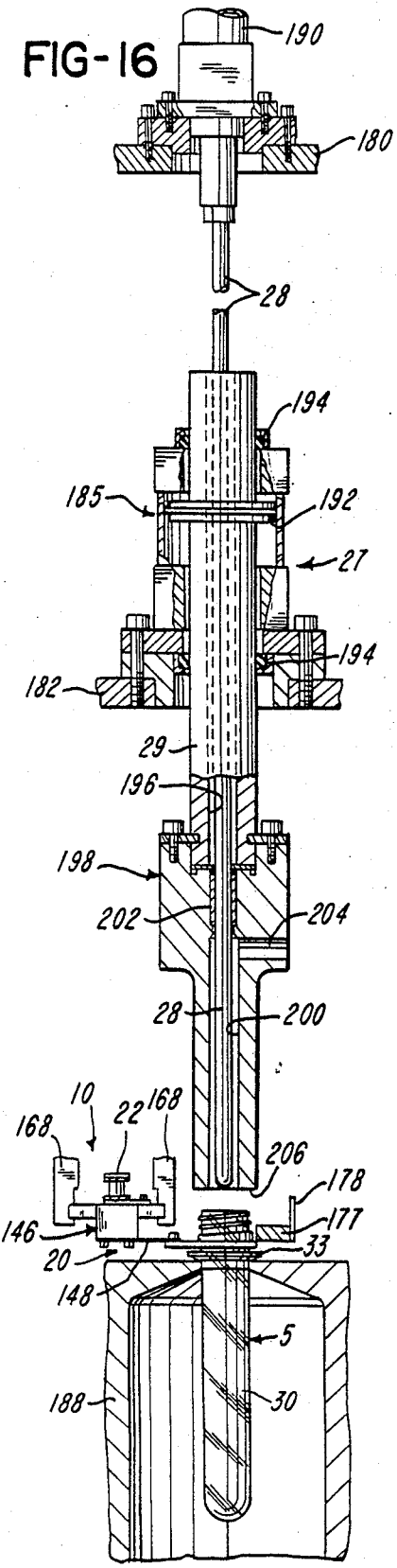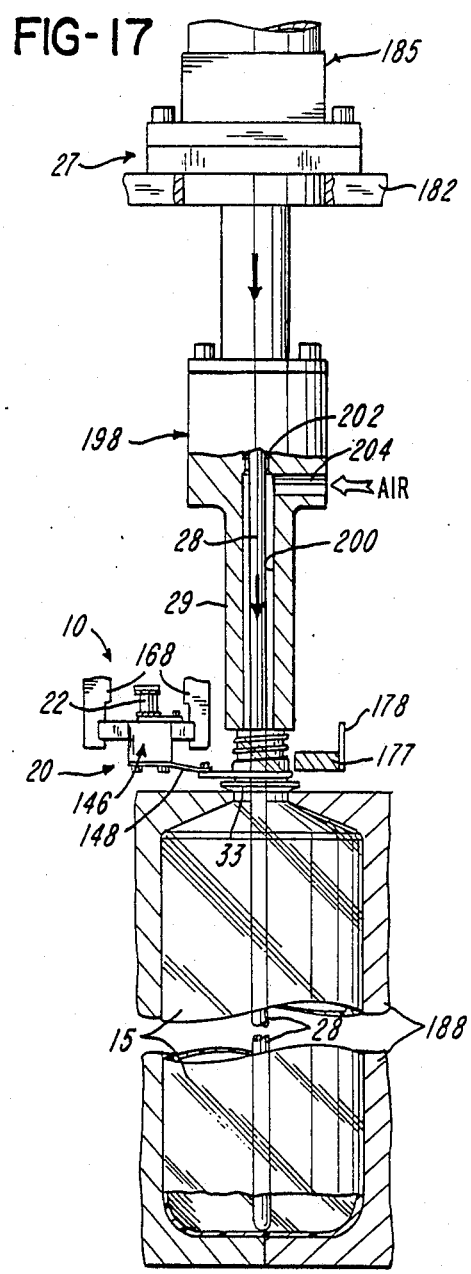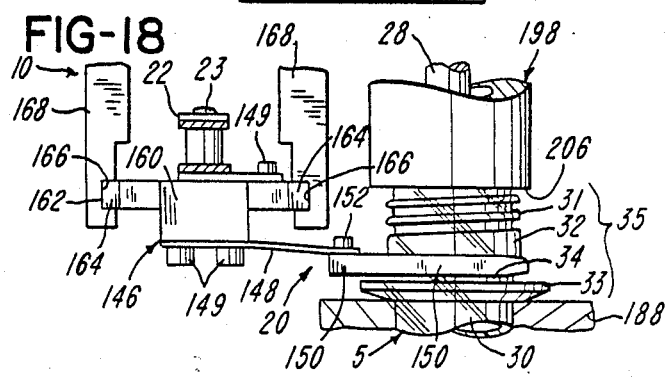

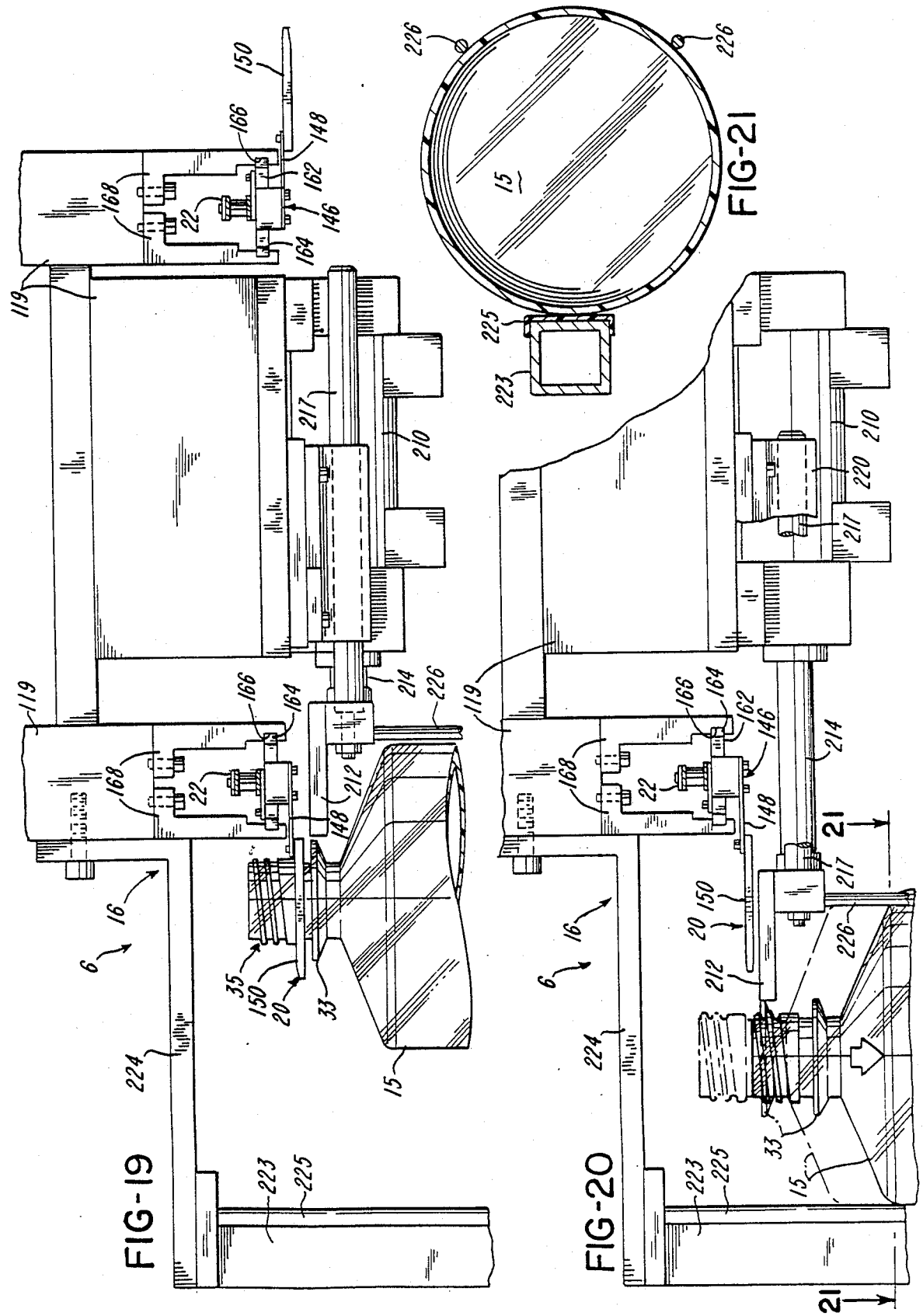

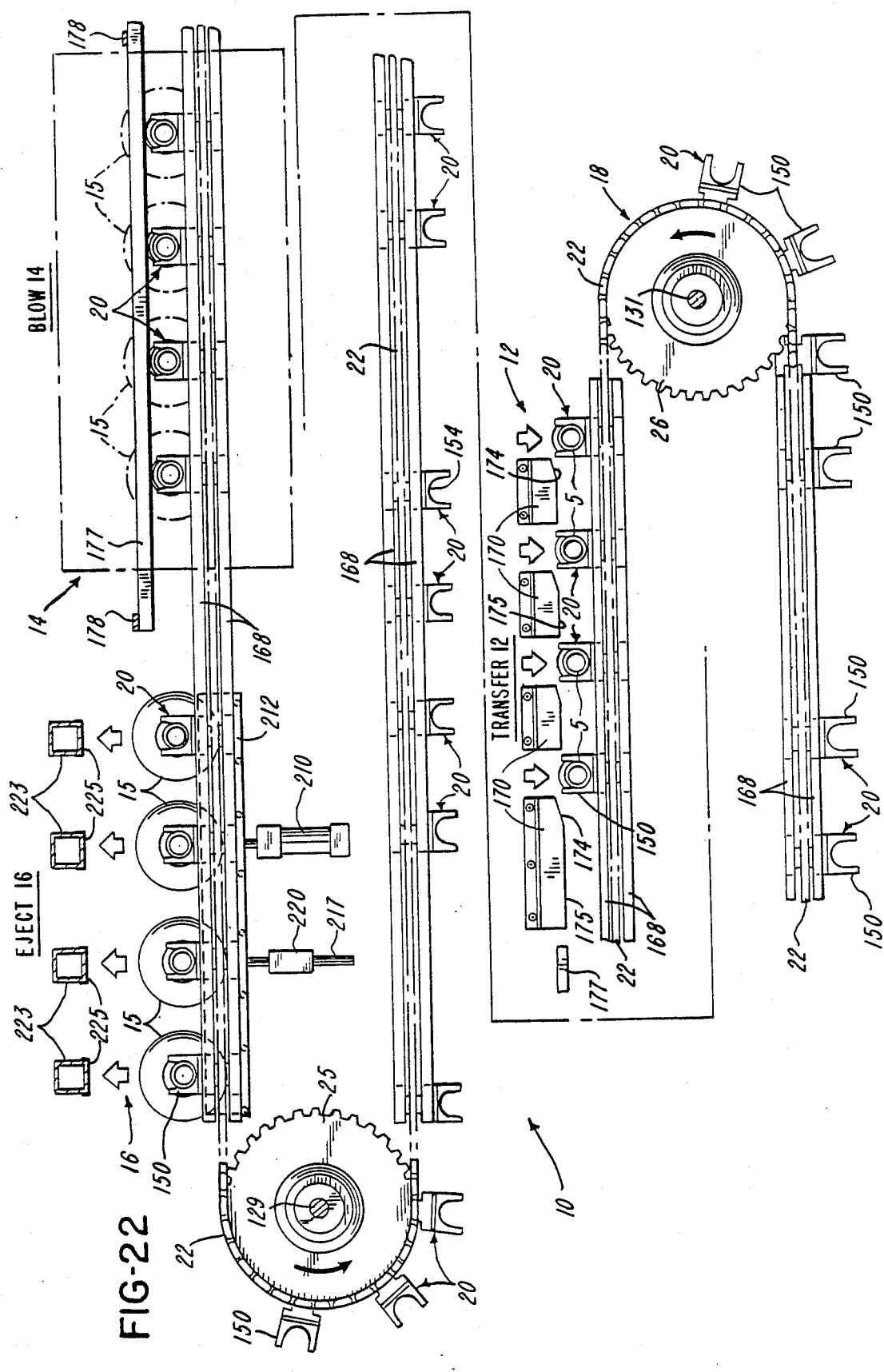

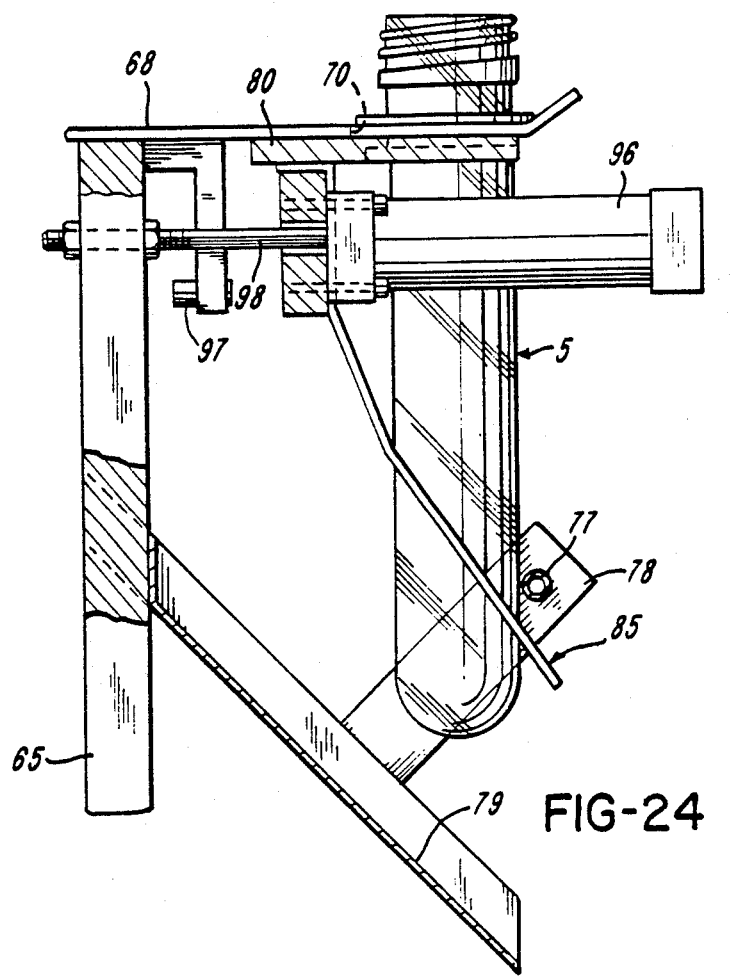
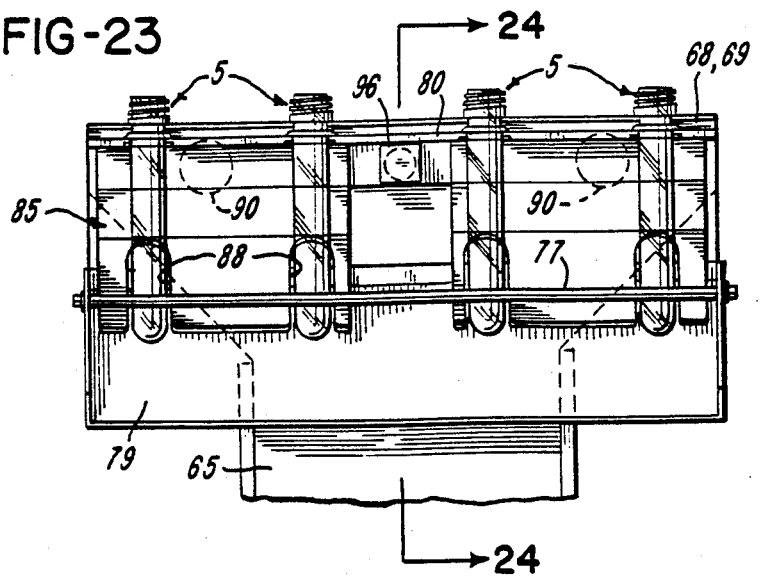

BLOW MOLDING APPARATUS

This is a division of application Ser. No. 869,499 filed June 2, 1986.

The present invention relates to an improvement in plastic blow molding apparatus. One aspect is a conveyor system for handling an elongated article—or plurality thereof—that depend from a part of the system. One aspect is an improvement in a preform handling system for a reheat blow molding apparatus to move one or more injection molded plastic resin preforms from an oven to a blow mold and to remove the blown product from the blow mold in connection with which the invention will be described without intending to be limited thereto.

Blow molding is used in the art of manufacturing hollow articles such as bottles and jars from various plastics and resins such as polyethylene, polyvinyl chloride, polyacrylonitrile, polyethylene terephthalate and the like.

In reheat blow molding, the plastic is first injection molded to make a preform. Later on, in a separate operation, the preform is reheated to a suitable temperature and is then blown into a product. The temperature is selected to provide biaxial orientation of the end product, commonly a soft drink bottle. Where the end product is to be, for example, a bottle with a threaded neck, the injection molding yields the advantages of reducing thermal memory problems and providing a threaded neck which will not change significantly in shape or dimension during further processing.

The present invention is adapted to handle an article for blow molding in the form of an injection molded hollow preform of such resin which in turn is shaped like a test tube that has external threads about is open end or finish. The body of the preform has been heated to an orienting temperature but the threaded end (finish) has been kept cool, unheated because such end is not to be blown. Typically, such a preform has a tamperproof ring at the bottom of the threads and a stacking ring (sometimes called capping ring) underneath the tamperproof ring: the axial space between these rings typically defines a groove and is preferably the portion of the preform engaged by the conveyor of the present invention.

Blow molding apparatus of the sort to which the present invention is preferably applied and of which it is an improvement is the Cincinnati Milacron RHB-V heat blow molding machine which has been in use for well over a decade. Such machine (or components) is described in a number of U.S. patents, among them U.S. Pat. Nos. 3,958,685; 4,082,175; (both teaching couplings, conveyors suitable for ovens and ovens) and 4,185,812 (blow molding pallet for use at a blow mold work station) which are expressly incorporated by reference herein.

The system of the present invention, while generally applicable to article handling, is preferably adapted to blow molding and most preferably is intended to replace the pallet assembly described in '812 and also to provide as a component an improved novel means to transfer thereinto heated preforms from a reheat oven or other source (e.g. like '685 or '175).

One object of the present invention is provision of an improved means for transporting a workpiece from a first station where received in the means through a number of stations. Another object of the present invention is provision of an improved conveyor system for handling one or more elongated depending workpieces. An object of the invention is to provide a handling system for a reheat blow molding apparatus to move one or more injection molded plastic resin preforms from an oven to a blow mold and to remove the blown product from the blow mold.

The invention thus includes a reheat blow molding apparatus to move a heated preform from an oven to a blow mold where it is blown into a hollow product using a stuffer assembly and to convey such product to an eject station wherein the preform has an unblown finish having at its lower end a capping ring from which depends a hollow tubular body that is blown to form the product and a groove immediately above said capping ring, the ring and groove acting as locating means, and the remainder of the finish being above said groove. Further, the invention comprehends a blow molding machine with an oven section; a blow mold section for blow molding the preform into a hollow product and ejecting such product from the machine; a preform transfer station, a blow station, a blow mold at said blow station, and a product eject station disposed linearly along one side of said blow section; a carriage means for receiving a preform from the oven and moving same to the preform transfer station; an endless conveyor drive member (such as a roller chain) in said blow mold section disposed in a horizontal plane (with the pins vertical if a chain) and with a straight run extending along said blow section one side; a plurality of outward facing preform holder means (each to engage a preform by the groove) spaced at a predetermined interval from each other along said conveyor such that a holder means is at each of said stations at the same time; and said carriage means having a fail safe structure to remove any accidentially retained preform prior to loading at the oven.

One aspect of the invention relates to conveyor apparatus for conveying a plurality of preforms (each preform being engaged by a conveyor holder at a groove between the capping and support rings on the upper end) from a transfer or loading station through a blowing station where each preform is received in a blow mold and converted to an expanded hollow product therein, and then to an eject station where such product is ejected, which apparatus indcludes roller chain disposed in a horizontal plane with its pins vertical and about sprockets; a plurality of groups of preform holder assemblies arranged in succession on said chain, the preform holder assemblies in each group being spaced the same as the blow molds are spaced so the preforms may be presented aligned with respective blow molds; and an intermittent drive means to periodically move the chain an amount to remove an entire group of holder assemblies (with —when operating—products from said blow molds) to the eject station and to replace same with the next succeeding group of holders. Another aspect in such a conveyor wherein each holder assembly has a resilient member with an inner end and an outer end supported at its inner end from the bottom pin link plate of the chain with the other end extending outboard of the chain pitch line; and a holder means on the resilient member outer end having a notch therein to receive and snugly fit the preform groove, such notch being located to dispose the preform in alignment with its respective blow mold; and guide means for urging each preform fully into its holder notch thereby to acquire and keep predetermined location.

The present invention also includes improvements of the stuffer and ejector. The instant stuffer establishes a face seal relation with the preform enabled by resilient support of the preform by the conveyor and also (when equipped with a center rod) uses a hollow stuffer rod with a telescoping relation between stuffer and center rods with a lot less mass to move than heretofore. The ejector drops the product straight down and keeps the orientation straight up and down, thus simplifying the chore of product removal due to reliably keeping a pre-selected orientation during ejection. Other objects advantages and features will become apparent from the following detailed description when read in conjunction with the annexed drawings wherein:

FIG. 1 is a partially cutaway front elevation of a reheat blow molding machine equipped with the invention and generally depicting the oven discharge and blow molding portion of the machine;

FIGS. 3 and 4 are enlarged side elevation views showing successive positions of the carriage assembly (reach and take assembly) outer or top plate, preform, and oven coupling during reception at the oven discharge;

FIG. 5 is a top view on section 5—5 of FIG. 4;

FIG. 6 is a section on 6—6 of FIG. 4;

FIGS. 7 and 8 are side elevation views on section 7—7 of the FIG. 1 carrier assembly at the transfer station at the time of preform transfer into the blow mold conveyor and immediately after, respectively, depicting a mechanical fail safe (abort) system in respective deactivated and the activated positions;

FIG. 9 is an enlarged view of a part of FIG. 7 showing relationship at the transfer station of preform, outer plate of the carrier, and holder assembly;

FIG. 10 is an exploded isometric view of a section of the conveyor roller chain, holder, and guides;

FIG. 11 is a side elevation of the carriage assembly of FIGS. 7 and 8 showing how a cam operates the fail safe system during the return-to-oven movement;

FIGS. 12 and 13 are enlarged views of the FIG. 11 fail safe clearance plate, or inner plate, in different positions relative to the carriage outer plate;

FIG. 14 is a partly cutaway top view of the carriage of FIGS. 3, 4, and 11-13 as seen on section 14—14 of FIG. 1;

FIG. 16 is a partial section side elevation along 16—16 of FIG. 1 showing the telescoping relation of the stuffer and center rods and alignment therewith of holder assembly, preform, and blow mold;

FIGS. 17 and 18 are enlarged views of parts of FIG. 16 emphasizing the face seal flexing of the holder into a sealing position respectively, and FIG. 18 also shows the snug fit between the holder and groove;

FIGS. 19 and 20 show the ejector workstation along 19—19 of FIG. 1 before and after ejection from the holder;

FIG. 21 is a section along 21—21 of FIG. 20;

Figure 15:
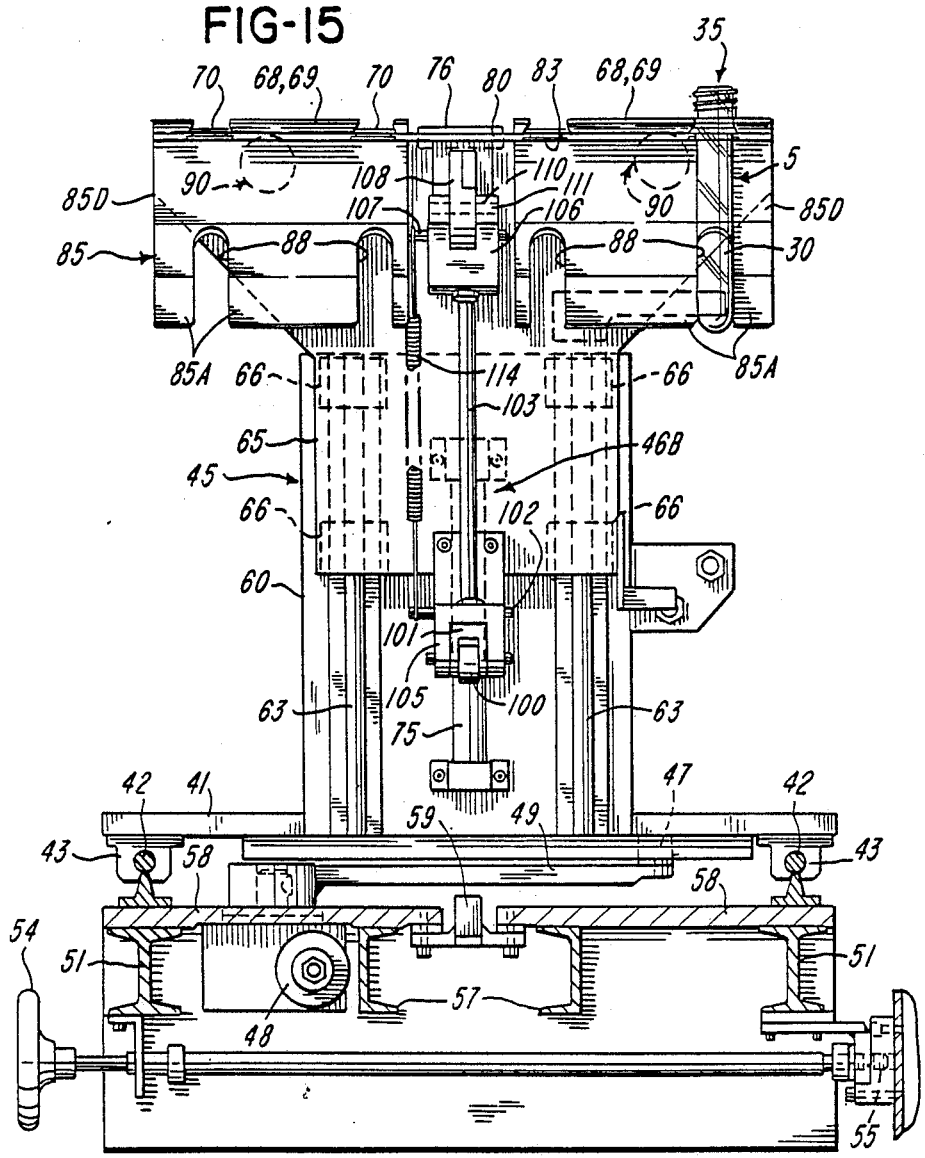
FIG. 15 is a rear elevation partial section view of the carriage assembly along 15—15 of FIG. 2 showing the vertical carriage drive means and other features.

FIG. 22 is a top plan view of the roller chain along 22—22 of FIG. 1 depicting, inter alia, the guide blocks straddling the lanes at the carriage-conveyor transfer station; and FIGS. 23 and 24 illustrate a preferred fail safe system, are respective rear and side views comparable to FIGS. 15, 9, omit some parts for clarity, and show optional features omitted for clarity from other FIGS., FIG. 24 being a section along 24—24 of FIG. 23.

Throughout the following description the same reference numbers are used to refer to same parts. As already stated above, the description is made by way of reference to the preferred application of the present invention to handling a preform in an RHB-V blow molding system, it being understood that other applications of similar shaped articles are within the spirit of this present invention. The present invention also is described and illustrated for the handling of four articles at a time, it being understood that a different quantity can be handled simultaneously and that the description usually refers to the handling of only one for the sake of simplicity, not by way of limitation.

GENERAL DESCRIPTION (FIGS. 1, 2)

The purpose of the blow molding conveyor 1 of the present invention is to receive a preform 5 when ejected from an oven 7 in which it has been heated and then to transport it through a series of operations which include blow molding it into a bottle and ejecting it from the blow molding machine 6. To do this, oven 7 ejects preform 5 vertically downward into a carriage assembly (reach and take) means 9. The carriage assembly means moves the preform to where it is engaged by a conveyor system 10 at a transfer station 12. The conveyor system has three work stations through which it moves the preform: the aforementioned transfer station 12, a blow molding station 14 where preform 5 is blow molded into a product 15, normally a bottle, and then an eject station 16 where the preform is removed from the machine environment. The conveyor system preferably comprises an endless conveyor member 18 having holder means 20 protruding therefrom. The preform 5 is transferred from carriage assembly 9 at the transfer station 12 into one of the holders 20 and stays engaged therein from the work station through the blow molding and eject operations and stations.

Preferably, the endless conveyor member 18 which interacts with carriage 9 comprises a roller chain 22 disposed with its pins 23 (FIG. 10) vertical and around sprockets 25, 26 (FIG. 22) which turn about vertical axes.

The invention also includes an improved stuffer 27 for use at the blow station featuring telescoping center and stuffer rods 28, 29 and a face seal structure for interacting with the preform and the blow mold to achieve molding. Further, the invention includes a unique aspect of the ejection apparatus which ejects the preform along a vertical axis, thereby providing a predetermined position as well as location below the machine where it may be received and taken away by means not part of the instant invention.

THE PREFORM (FIGS. 2-6, 9, AND 18)

The preform 5 (FIG. 2) is of injection molded thermoplastic biaxially orientable material which will so orient upon being blown in a mold under certain conditions, including preform temperature. For example, polyethylene terephthalate orients in the range from about 200° F. to 250° F. Preform 5 has a hollow body 30 of circular cross-section, shaped like a test tube with an externally threaded lip 31 above a pilfer proof ring 32 which is above a support ring 33. The space between the two rings 32, 33 provides an annular groove 34 by which holder 20 engages the preform.

Preform 5 is not blow molded in the region of threads, groove and rings——collectively called the finish 35——hence is not heated in such region by the oven. For this reason the preform is handled (e.g. FIG. 2) and engaged (FIG. 6) by its finish 35 until the blow molding has been accomplished.

The biaxially orientable material is commonly and preferably polyethylene terephthalate in amorphous form but may also comprise other biaxially orientable resin. Preform structure, materials, etc. are described generally in the above mentioned U.S. Patents and elsewhere to all of which the reader is referred for additional preform information.

REACH AND TAKE OR CARRIAGE ASSEMBLY MEANS 9

(FIGS. 1, 2, 7, 8, 11–15)

The reach and take assembly 9 comprises on frame 40 a horizontal carriage base 41 supported on guide rails 42 by means of linear bearings 43 to move back and forth between oven 7 and transfer station 12 of the conveyor system. A vertical carriage assembly 45 is also mounted on carriage base 41 and is constructed to move at proper times from a low preform-receiving elevation (FIGS. 2, 8) underneath oven 7 to a greater elevation (FIG. 7) where the preform is at the correct height for receipt and engagement by conveyor system 10 at transfer station 12. There is also an abort or fail safe means 46 (46B in FIGS. 1–15; 46A in FIG. 23, 24) associated with vertical assembly carriage 45 to insure that no preform remains in carriage assembly 9 at the time it is moved underneath the oven.

A rotary actuator 48 is secured to frame 40 underneath horizontal carriage 41 which it engages by sort of scotch yoke 49 to cause the back and forth motion of the overall carriage assembly or reach and take. Scotch yoke 49 includes two spaced apart rails secured underneath base 41 and within the resulting groove moves a pin or preferably cam follower 47 (FIGS. 7, 8) on the actuator crank arm. The rotary actuator is preferably a hydraulic cylinder designed to provide 180° of crank operation and then to reset and is commercially available.

As should be appreciated from the drawings, four preforms 5 are handled at a time, that being the quantity received simultaneously from oven 7. However, since their handling is identical in each lane, the description is given for one preform only, it being understood that the system is capable of conveying a plurality of them from the time they are received from oven 7 to the time they are ejected from the conveyor system at station 16.

Frame 40 (see FIGS. 2, 14) is preferably an assembly rather than a solid piece of material and includes channel end pieces 50 and I-beam side sills 51 arranged in a rectangle with gussets 52 on the corners, a mounting hinge 53 securing one end of same to the base of the blow molding machine and a hand wheel 54 operated lock on the opposite base end to secure as by threads 55 to the blow molding machine. Center sill channels 57 and slats 58 provide central stiffness and a recess in which is secured cam 59 of the fail-safe system.

A vertical cylinder mounting plate 60 is secured at right angles to base 41 and reinforced in that position by gussets 62: these elements, bearings 42 and vertical guides 63 (secured to plate 60) are all included in the horizontal carriage assembly which in turn supports vertical carriage assembly 45.

Vertical carriage assembly 45 includes the vertical carriage base 65 on which are mounted linear ball bushing bearings 66 which are guided vertically by guides 63. An upper support ring plate 68 is fixedly secured to the uppermost end of base 65 and has a locating means 69 on the plate trailing edge consisting of the upwardly bent trailing portion (see FIGS. 3–6). Support ring notches 70 are cut in the upper plate trailing edge and, as seen from above (FIGS. 5, 14) are shaped like the Greek capital letter Omega ($\Omega$) to define, in the horseshoe or U-portion, a circular sector 71 recess just slightly larger in diameter than (about 0.030 inches to 0.050 inches preferably 0.040 inches) the diameter of preform support ring 33. The legs of the Omega ($\Omega$)——which terminate in locator or bent edge 69——are spaced apart sufficiently to allow the preform body 30 readily to pass between them (about 1/16 inch to ⅛ inch more than the diameter of body 30 and in FIG. 6 designated distance 72).

A vertical power means that preferably is double acting air cylinder assembly (or more broadly, fluid cylinder) 75 is secured to cylinder plate 60 and its plunger or piston rod is drivingly connected to vertical carriage assembly 45, preferably as shown to base 65 by tab 76 (FIGS. 7, 8). Cylinder 75 reciprocates to push the vertical assembly 45 from the lower position at the oven (solid lines FIGS. 2, 8) up to the level of the aligns groove 35 with holder 20 (dotted FIG. 2, solid FIG. 7) for transfer at station 12, respectively.

FIGS. 23, 24 illustrate optional but preferred fly bar 77 held by and between brackets 78 which are secured to the edges of tray 79 that in turn is secured to vertical base 65. The tray guides any preforms accidentally hung up when they drop to a location (e.g. scrap bin underneath, not illustrated). Fly bar 77 keeps the preform lower end from swinging counterclockwise (FIG. 24) under inertia and may conveniently be made of tubing.

FAIL SAFE MEANS (FIGS. 1–15, 23, 24)

FIGS. 1–15 and FIGS. 23, 24 respectively, show mechanical fail safe means 46B and preferred power cylinder fail safe means 46A to assure removal of an accidentally retained preform in vertical assembly 45. Both means have a reciprocatable inner plate 80 (FIGS. 3–6) mounted immediately underneath and in sliding engagement with outer plate 69. This inner plate supports the preform by engaging the underside of the support ring and is withdrawn from underneath preform support ring 33 (see FIGS. 12, 13) to remove such support and is likewise withdrawn to assist in removing an accidentally retained workpiece. U-shaped notches 81 are in the trailing edge of plate 80 and preferably as depicted (FIGS. 5, 6) are shaped to include a semicircular end 81C with two parallel legs 81E (FIG. 6) each tangent to the ends of the semicircle. Semicircle 81C has a diameter about 0.005–0.020 inches larger than the diameter of the preform body at that point (e.g. FIG. 6). Notch 81 has as undercut or relief 83 to minimize the area 84 in contact with the preform body 30, hence to reduce conductive heat transfer away from such body. Guide plate 85 is fixed to movably plate 80 and preferably is bent out of sheet metal to have (FIG. 4) mounting flange 85F, vertical web 85D depending therefrom, and an apron 85A extending obliquely from the web to a location under notches 81. Apron 85A has notches 88 cut therein and shaped like the projection of notches 81 onto the slope or plane of apron 85A. Plate 85 holds preforms in the preferred exactly vertical posture and assures preforms ejected during fail safe fall away, among other features.

In the depicted (FIGS. 14, 15) presently preferred construction, two mirror image outer and inner plate 68, 80 are provided, one right hand and left version of each and spaced apart sufficiently to provide a central gap. Use of two short pieces of each facilitates manufacture of a flat part, although one long piece for each may be used. Flange 85F and web 85D of guide plate 85 extends all the way across on cross bar 89 and support thereon both inner left and right hand plates 80, thus obtaining movement as one when the actuating means operates and resets the inner plate(s) 80.

Also, as best shown in FIGS. 12-15, the assembly of an inner plate(s) 80 and guide plate 85 is movably mounted on a pair of linear ball bearings 90, the bearing cage 91 (FIG. 13) of which is secured to vertical plate 65 and the guide rod(s) 92 (FIG. 12) of which are secured to the 80, 85 plate assembly. A snubber or shock absorber in the form of a resilient pad or washer may be provided at each end of the guide rod between the retaining nut and the bearing end.

FIGS. 23, 24 show abort cylinder 96. Cylinder 96 is mounted on or under plate 80 and its plunger 98 secured to vertical carriage plate 65 by L-shaped bracket 97. Admission of air in the left end of 96 moves or actuates cylinder 96 to reciprocate inner plate 80 from the normal or preform support FIG. 12 position to the fail safe eject position of FIGS. 11 and 13.

The mechanically actuated fail safe 46B depicted in FIGS. 2, 7, 8, 11-15 has a linkage that is actuated by engaging cam 59 to move inner plate 80 from the preform supporting position illustrated in FIGS. 3, 4, 12 to the eject or clearing position of FIGS. 11, 13 whereby an undesirably retained preform falls away as in FIG. 11. The linkage is a four-bar crank mechanism mounted on vertical carriage plate 65 and has a roller type cam follower 100 supported on crank 101 which swings about a pin or axle 102 supported from plate 65. Connecting rod 103 has respective lower and upper clevises 105, 106 secured thereon (as by the illustrated, not numbered, known thread-and-locknut). Lower clevis 105 provides the pin or pivot between crank 101, rod 103 and on which roller 100 turns.

Upper clevis 106 connects by pin joint 107 to bell crank 108 which is revolvably mounted to turn about pin 110 which is in turn supported from plate 65 by bracket 111. Helical spring 114 is held in tension between pins 102 and 107—hooks on the spring ends rest in annular grooves on the overhanging portions of the pins as is well known (FIG. 15). Tension in this spring biases the crank mechanism in FIGS. 7 and 12, i.e. to the position of FIGS. 3, 4 where inner plate 80 can support a preform from the underside of ring 33.

The other arm of bell crank 108 ultimately connects to plate 80 through a sort of scotch yoke 115, 116, 117 to allow for changing center distances. Thus, when reach and take assembly 9 is moved from the transfer station 12 to the oven discharge station, follower 100 hits cam 59 enroute, actuating the fail safe whereby bell crank 108 moves counterclockwise as seen in FIG. 12 to the FIG. 13 position whereupon any undesirably retained workpiece is removed. The Scotch yoke here comprises roller cam follower 155 on the bell crank, a bracket 116 secured to cross bar 89, and vertical groove 117 in the bracket in which is received follower 115.

THE INDEXING DRIVE TRAIN (FIG. 1)

This is an assembly of commercially available items that functions to periodically index the conveyor system (chain 18 and holders) thereby to move a group of four preform holders successively into transfer station 12, to blow station 14, then to eject station 16, and then to step the group back around to repeat same——all in synchronism with the oven eject and reach and take functions. It includes mounted on frame 119 an electric motor 120 driving a clutch-brake 122 through a timing belt 123 wrapped about suitable toothed pulleys. A gear reducer 125 slows down rotary speed (10:1) and feeds its output into an index drive unit 127 which is commercially available from several USA sources such as Ferguson Machine Company, St. Louis, Miss and/or CAMCO (Commerical Cam Division, Emerson Electric), Wheeling, Ill. Preferably a 90° dwell, 270 index per 360 input is used but this does depend on original motor 120 speed and overall speed reduction.

The indexing (i.e. periodical unidirectional arcuate motion) from 127 output goes through suitable shafting 129 to chain drive sprocket 25. Shafting 129 is preferably an assembly with a roller bearing supported shaft housed in a pillow block. Idler sprocket 26 (FIG. 2) is constructed and mounted similarly on assembly 131 at the other end of the conveyor preferably with a chain tensioning means 133. Assemblies 129, 131 and tensioner 133 are mounted on frame 119.

CONVEYOR SYSTEM 10 AND HOLDER 20

(FIGS. 1, 2, 7-9, 18, 22)

The Conveyor System 10 includes an endless conveyor member 18 (FIGS. 1, 2) preferably a roller chain 22 (FIG. 10) which is wrapped in endless fashion about sprockets 25, 26 (FIG. 2) and thus, along with other parts of the system, is mounted directly or indirectly on frame 119. Note that mounting components on frames 40, 119, permits manufacture of these items of commerce and facilitates retrofitting RHB-V blow molding machines as well as use in other contexts in contrast to on-site assemblage.

Chain 22 is supported with its pins 23 on vertical axes and preferably is prestretched and is kept linear and in tension on the active side of its path so that workstation 12, 14, 16 may be along a straight line and the workpiece only has to travel linerally.

Roller chain construction is well known but for background and convenience the standard nomenclature of some FIG. 10 parts is now given (using terms from Mark's Mechanical Engineers Handbook, Fifth Ed., page 925 et seq.): a pair of pin link plates 140 connect adjacent pins 23 and are disposed on the outside of the chain; about each pin is a bushing 141 which preferably extends through the roller link plate 143 on the inside of the pin links 140; a roller 144 is about each bushing and spaces the pair of roller links 143.

Figure 2:
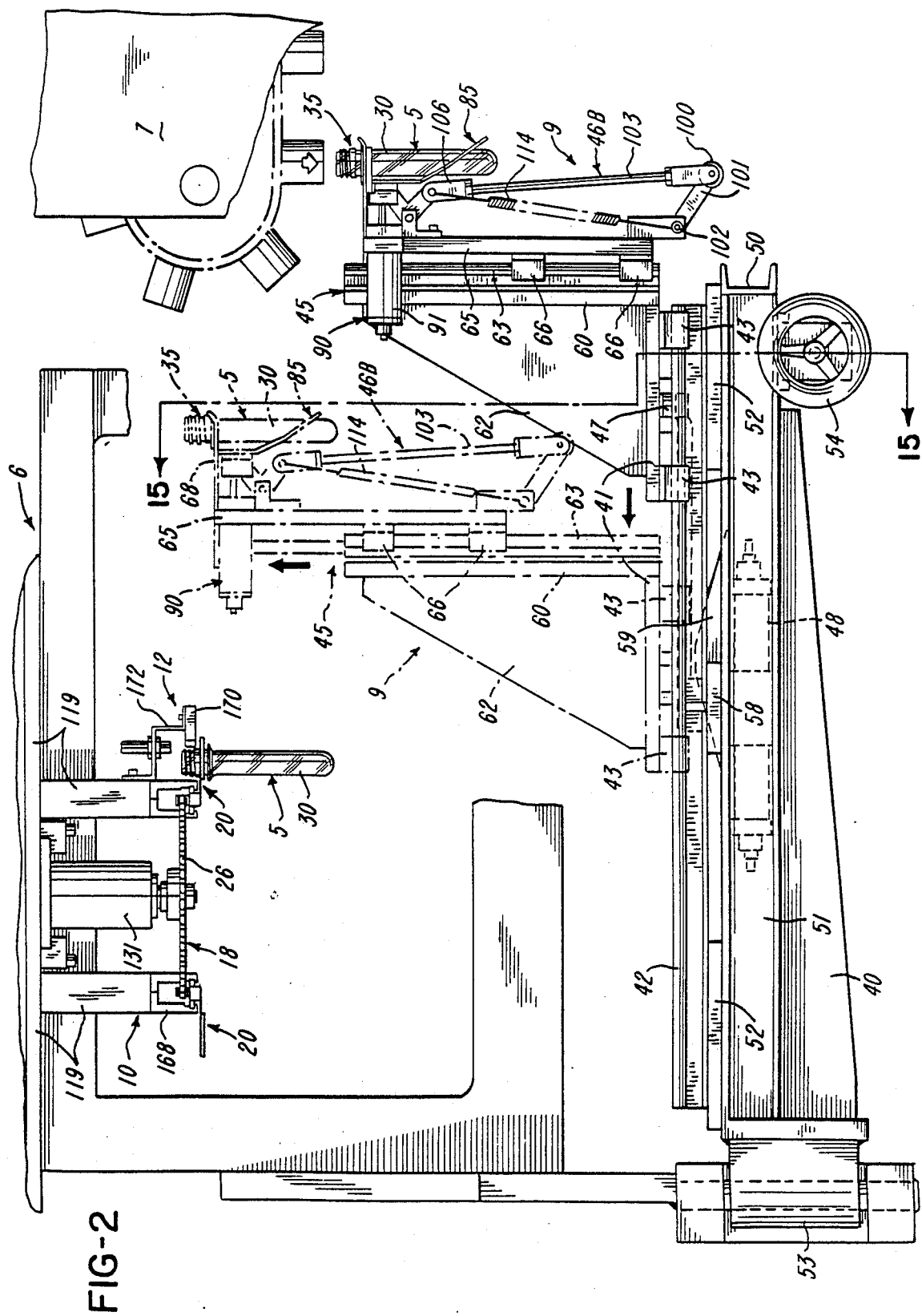
FIG. 2 is a side elevation as from 2—2 of FIG. 1.

Holder assembly 20 (FIG. 10) is attached to the chain by using an extra-long pair of pins 23X (extended pins) secured in the usual manner to an uppermost pin link 140 and which pass through the bushings and rollers to the lowermost special pin link 145 which is oversized (that is, has an integral lug as an attachment means which extends out from the chain as illustrated in FIGS. 2, 10, 22) through a low friction (e.g. nylon 101) carrier guide 146 and finally through the inboard end of leaf spring 148 where a rivet head or other fastener secures all together. That is, extended pin 23X secures together the usual parts of a roller chain between a pair of pin link plates and additionally secures on the lower side carrier guide 146 and spring 148. Cap screws 149 provide supplemental fastening of carrier guide 146 to lug 145 and spring 148, respectively.

Holder per se 150 comprises the above assembly 20. Holder 150 is attached by a pair of screws 152 to the outer or free end of spring 148. The holder has a U-shaped notch 154, 155, 156 of a size and thickness (FIG. 18) to snugly engage groove 35 of the preform. For example semicircular rear part 154 of the notch should be 0.980 inch diameter and a 0.147 inch thickness for the standard groove 35 on a standard finish for a 28mm soft drink bottle and similarly for other sizes. Legs 155 of the notch are parallel on the inside and, of course, spaced by the aforesaid diameter. The ends 156 of the legs are tapered about 5° top and bottom.

Preform 5 is moved in a path where the flat bottom 33B of the support ring 33 clears the top of blow mold by about 0.005 inches. This clearance is eliminated during blowing by the stuffer nose flexing spring 148 to establish seals between 33B and the blow mold and a face seal between nose and finish.

Carrier guide 146 is molded of low friction plastic material preferably nylon 101 and has a main body part 160 (through whcih pins 23X pass) of the correct thickness to provide alignment (especially vertically) at the work stations. On opposite sides of the body are linear bearings 162 which have a leader slope or taper 164 on the leading and trailing corners. Bearings 162 slide in grooves 166 in rails 168. A pair of rails 168 secured to frame 119 (FIGS. 9, 19) with the chain 22 supported in between by bearings 162 engagement with groove 166. The rails are disposed (FIGS. 1, 22) along the straight runs of the chain, especially on the line past the work-stations 12, 14, 16 and on the return run.

Referring to FIGS. 1, 2, 18, 22 means are provided to guide, urge, retain the workpiece (preform or bottle) against the curved backside 154 of holders 150 thus to positively locate at predetermined positions at the workstations. In the illustrated embodiment, preforms 5 are delivered from the oven by carriage assembly 9 in a group of four along four lanes into a corresponding number and group of holders 20 at transfer station 12 (FIG. 9). A plurality of guide blocks 170 (FIG. 22) are supported by brackets 172 from frame 119 downstream of each lane so that movement of the group of preforms from station 12 to station 14 moves them past the guide blocks and guides then keeps all preforms located against backside 154 of the holder notch. Each guide has a taper 174 converging in the direction of movement (i.e. from 12 to 14) and a straight section 175 to maintain position. Guide blocks 170 are spaced—see FIG. 22—to permit the movement between them of the preforms during the transfer from the carriage unit 9. A continuous blow mold guide rail 177 is supported at the blow station 14 by bracket 178 to maintain preforms location there for the blowing function (FIG. 16–18).

Preferably the sprockets are of equal size and the side of the chain in tension runs past the work stations 12, 14, 16 which latter are spaced outward from the chain sufficiently to align correctly with proforms in the holder 20 notches. The holders in turn are arranged in groups (shown as four) corresponding to the number of blow molds and spaced within the group the same as such molds. The groups, rather corresponding holders in successive groups are spaced the amount the chain moves on each iteration, which is usually greater than the spacing between holders in a group.

STUFFER 27 (FIGS. 1, 16, 17)

In blow molding of plastic bottles, stuffer is the common term for a device to connect a preform to a source of air for blowing. The prior art for an RHB-V used a yoke to raise and lower all the stuffers at once and inserted a male element into the finsish 35. The present invention has a face seal to the finish and also has independent movement of the stuffer 27 for each preform with a novel telescoping relation between stuffer rod (and nose mounted on it) and the center rod 28 where the latter, as an option, is provided.

As shown in FIG. 1, the stuffer assembly 16 is mounted at the blow molding station on a frame having an upper cross piece 180 on which is mounted the center rod cylinder and a lower cross piece 182 secured to their frame 119 and on which are supported the stuffer cylinders 185. All of these are vertically aligned to be substantially coaxial with the blow mold 188 associated with each stuffer and center rod unit.

Both the center rod cylinder 190 and stuffer cylinder assembly 27 are double acting and preferably are pneumatic rather than hydraulic in order to keep air above the molds and parts handling the preform. Use of air above, as is well known in the art, reduces or eliminates problems associated with hydraulic oil systems such as leaks, contamination of the product, misting etc.

Stuffer cylinder assembly 27 has a hollow double ended plunger 29 mounted on the piston 192, each end of plunger 29 protruding from its respective end of the cylinder past an air seal 194. This plunger is hollow, having a bore 196 that is big enough to permit the center rod 28 to pass completely therethrough and to operate in telescoping relation. On the bottom end of the stuffer assembly is a stuffer nose 198 having a longitudinal bore 200 coaxial with and substantially the same size as the bore 196 through the plunger. A seal 202 to avoid air leaks is provided at the upper end of nose bore 200 to prevent leakage of compressed air past the center rod. Air as seen in FIGS. 16, 17 is brought from a source through a passage 204 in the wall of the stuffer nose into the nose bore.

At the lowermost end of nose 198 is face sealing surface 206 which establishes a face seal with the top of the preform 5. Enough pressure is applied to the upper cylinder to maintain this face seal against the pressure of blow air passing into the hollow part of the preform from the stuffer nose bore.

As shown in FIGS. 16, 17, 18 when the system is in a blowing mode with air entering through the stuffer nose bore, the leaf spring 148 of holder assembly 20 is flexed slightly to permit the sealing of the ring 33 against the top of the blow mold. The leaf spring flexes rather than requiring substantial deflection of roller chain 22 which later would be undesirable because it would be in the direction of the pin 23 axes.

EJECTOR 16 (FIGS. 19, 20, 21, 22)

The ejector station 16 is where double acting air cylinder 210 pushes the now blown bottles out of the open end of the notches 154–156 to a location where they can fall away. In the preferred embodiment, a plurality of vertical guides are provided so that the bottle falls away while being maintained in a vertical orientation.

FIGS. 19-22 illustrate the ejector air cylinder 210 with a pusher bar 212 on the end of its plunger 214. This pusher bar extends in the direction along the roller chain and is long enough to contact all of the now-blown bottles 15 at once during the ejection mold. The pusher bar being so long, one or more guide rods 217 are attached to it and fit in a linear bearing 220 supported on conveyor frame 119.

As best seen in FIG. 21, each bottle is pushed out of its holder notch against a fixed vertical guide bar 223 which depends from the frame 119, and being connected thereto by a suitably sized cantilever bracket 224. The face of this bar is coated with a very low friction wearing surface 225 preferably Teflon tape or a coating of a similar material.

Movable guide rods 226 depend vertically from the bottom of the pusher bar, two for each station and engage the bottle body. The movable guide rods do not engage the bottle until about the time pusher bar 212 engages the finish during the ejection function. The pusher bar 212 is shaped to over-reach the top of the bottle (FIGS. 19, 20) so that it can engage the finish support ring 33 to push the bottle all the way up against fixed guide rod 223 and at the same time bring depending guide rods 226 into engagement with the bottle body as illustrated in FIGS. 20, 21.

The timing of this cylinder and eject operation is such that bottle 15 begins to descend vertically while engaged between all three of the guide rods 223, 226 and has just about completed its descent when the cylinder 210 retracts the pusher bar 212 and moving guides 226 depending from it.

REVIEW OF MACHINE OPERATION

As mentioned in the section subtitled "General Description", the purpose of this invention to receive the preform in the carriage assembly 9 at oven 7, place it in the conveyor assembly 10 at transfer station 12 and then to move it through a blow molding operation at 14 and the eject station 16 where it leaves the machine as a finished product. Operation is understood by following a workpiece (initially a preform) through the machine referring to key machine elements now identified. Understand that preferably a plurality of workpieces, starting as preforms 5, usually four, are processed through the machine simultaneously.

The oven 7 indexes and stops with a preform hanging vertically ready to be discharged. At this point in time the carriage assembly 9 moves the notches 70, 81 vertically by means well known (e.g., the aforesaid patents) discharges the preform vertically down and into the notch where it is received and cause to self-center by reason of the relative size of notches 70, 81 and the bent trailing edge 69. The rotary actuator 48 now begins to swing its arm 180° to drive the carriage assembly and the preforms to transfer station 12. While this motion is taking place, the vertical carriage cylinder 75 is triggered and pushes or extends vertical carriage assembly 45 from its lower most position illustrated in FIG. 2. to its upper most position illustrated in FIG. 7, 15 (and phantom FIG. 2), thus adjusting the height to the correct level for transfer to the conveyor assembly at workstation 12.

As the rotary actuator completes driving the carriage assembly 9 all the way to the left as seen in FIG. 2, 7, preform groove 35 is engaged by notch 154-155-156 in the holder 20 as the carriage assembly moves or is swept underneath conveyor assembly 10. Thus, the preforms are literally swept free and clear of the carriage assembly and simultaneously engaged in the notch of the conveyor assembly holder.

At this point, vertical carriage cylinder 75 operates again to retreat, i.e. to pull carriage notches 154–156 down to portions of the preform and eliminating the probability of catching a preform in the carriage notches—or more correctly in plates 68, 80 or vertical plate 60 when the conveyor actuates to transfer preforms from station 12 to the next workstation. With the carriage pulled down to the FIG. 8 compressed position, the rotary actuator operates in the opposite direction to return the carriage assembly to the oven discharge for a repeat of the above events. This operation preferably takes place concurrently with operation of the conveyor assembly to transfer the workpiece through the work stations. However, during the return of the carriage to the oven discharge, the fail safe or abort system is actuated to insure clearing away any accidentially retained workpiece.

In the embodiment of FIGS. 2, 7, 8 cam follwer 100 hits cam 59 during this return stroke and actuates the four bar linkage to turn bell crank 108 and reciprocate inner plate 80 as in FIGS. 11, 12, 13. As exemplified in FIG. 11, this would clear away any preform accidentally retained.

In the preferred embodiment of FIGS. 23, 24 fail safe air cylinder 96 is actuated manually or in response to limit switch or sensor valve actuation to directly move the inner plate 80 back and forth to move the support 81, 83 from any retained preforms and then to reset the same.

The respective fail safe functions are completed by the time the carriage assembly is returned to the position of FIG. 2 where it is again ready to receive the next (batch of) preform(s) delivered from oven 7.

In the meantime, conveyor assembly 10 is actuated by the indexing drive system 120-127 of FIG. 1 to move the group of preforms just received at work station 12 to blow molding station 14, stopping in a correct and substantially coaxial alignment with the center line of the stuffer assembly and center rods 27, 28 located at that station. When this operation takes place, each preform 5 that has been located at blow station 14 has been converted to a bottle 15 (if the blow molding operation were successful) and the group is moved to the eject station 16. In the meantime, the following group of preform holders 20 is moved into position at transfer station 12 sliding on supports 162 and preforms guided means 170 where the above operations coordinating with the carriage assembly can be repeated at the correct time and the holder group ahead of the eject station move on around one interval each.

Once the preform 5 is located at blow station 14, the blow mold(s) 188 is/are closed, the stuffer assembly 27 operates and stuffer nose 198 engages the preform to create the face seal described in more detail with reference to FIGS. 18-22 and the system is now ready to blow mold a bottle by introducing air through the stuffer nose bore 200. If center rods 28 are provided (this is an option not all machines have), the center rod cylinders 190 are actuated by providing compressed air to drive center rods 28 down sufficiently fast to follow the preform to the bottom of the blow mold in a manner known in the art.

When the blow molding operation is completed the center rods 28 are retracted upwardly into the nose and the nose is, of course, retracted to eliminate the face seal and release compressed air within the now blown bottle 15, returning to the positions approximately illustrated in FIG. 1.

While the blow molding operation is taking place at station 14, an eject operation is taking place at station 16 by applying compressed air to the rear end of the cylinder 210 causing it to move the push bar out against the workpiece——now a bottle finish——and the movable depending guides 226 against the body of bottle 15. This moves the bottles out of the holder 20 notch 154 against the fixed vertical guide bar and the bottles then begins to fall away and continue to do so. The ejector cylinder assembly then resets.

Operations of a system as above on an RHB-V machine successfully blew four two liter bottles about every 2.3 seconds, the so-called cycle time. When dry cycling (i.e. no preforms or blowing) the machine can be speeded up to about 2.1 second cycle time. Cylce time when blowing is limited by the blowing and cooling time at the blow station.

Once the blow molding and eject functions have taken place (and they are both done at the same time on different groups), the blow molds are opened and the system is now ready to be indexed once more to repeat the foregoing.

What is claimed is:

1. An improved stuffer apparatus for use in blow molding a plastic bottle within a blow mold from a plastic preform and comprising:
    a stuffer cylinder having a hollow plunger with a first bore extending completely therethrough;
    a stuffer nose secured on an end of said hollow plunger, having a nose sealing structure for establishing an air tight seal with the preform, and haviong a nose bore extending coaxially from said first bore to and thru said sealing structure;
    a long stroke center rod cylinder mounted vertically above and coaxial with said stuffer cylinder, having a centering plunger that extends when fully retracted through all of the above bores to about a remotest part of said nose sealing structure; and having a stroke large enough to move an outboard end of said centering plunger from said fully retracted position to engagement with a bottom of the preform being blown when at the blow mold bottom; and
    blow air passage means in said nose for conveying blow air through the nose to an exit into the preform at said nose sealing structure.

2. An improved stuffer apparatus according to claim 1 further comprising:
    said air passage including an enlarged part at the end of said nose bore surrounding said centering plunger which part is located to exit into the preform being blown; and
    air seal means providing a sliding seal against air leaks between said centering plunger and at least one of said bores.

3. An improved stuffer apparatus according to claim 1 further comprising:
    said nose sealing structure comprises a face seal which achieves an air tight seal by compression against the preform.

4. An improved stuffer apparatus for use in blow molding a plastic bottle within a blow mold from a plastic preform and comprising:
    a stuffer cylinder having a hollow plunger with a first bore extending completely therethrough;
    a stuffer nose secured on an end of said hollow plunger, having a nose sealing structure for establishing an air tight seal with the preform, and having a nose bore extending coaxially from said first bore to and thru said sealing structure; and
    blow air passage means in said nose for conveying blow air through the nose to an exit into the preform at said nose sealing structure.

5. An improved stuffer assembly apparatus for a blow molding machine comprising:
    a stuffer frame supported above the blow molds of such machine;
    a plurality of double acting long stroke fluid cylinders supported on an uppermost part of said frame each with a plunger substantially vertical and coaxial with the longitudinal axis of a preform to be blown;
    a corresponding plurality of double acting short stroke stuffer cylinders each being supported and located below a corresponding one of said long stroke cylinders for a vertical stroke; each having a hollow plunger with a center rod bore extending completely through it and that receives a corresponding center rod plunger in the hollow portion thereof;
    a stuffer nose on the lower end of each said stuffer cylinder plunger with a generally central bore aligned with its corresponding center rod bore;
    a seal surface on the lower end of said stuffer nose for sealingly engaging a preform during blowing, said stuffer bore passing thru said seal surface for communication with the interior of a preform to be blown;
    said stuffer bore having an enlarged lower end, the stuffer bore passing thru the seal surface as above;
    an inlet air passage through an intermediate part of said stuffer nose into said enlarged bore lower end;
    said center rod plunger extending in telescoping manner through said stuffer cylinder and its center rod bore and through said stuffer nose and its central bore and the enlarged lower end and having a stroke sufficient to move its lower end to the bottom of a workpiece when in the blow mold; and
    a seal between the center rod plunger and said central bore above each inlet air passage.

* * * * *